(12) United States Patent
Chargo (10) Patent No.: US 10,539,080 B2
(45) Date of Patent: Jan. 21, 2020

(54) INTERNAL COMBUSTION ENGINE INJECTION SYSTEM

(71) Applicant: Peter Chargo, Clio, MI (US)

(72) Inventor: Peter Chargo, Clio, MI (US)

( * ) Notice: Subject to any disclaimer, the term of this patent is extended or adjusted under 35 U.S.C. 154(b) by 56 days.

(21) Appl. No.: 15/633,880

(22) Filed: Jun. 27, 2017

(65) Prior Publication Data

US 2018/0306127 A1  Oct. 25, 2018

Related U.S. Application Data

(60) Provisional application No. 62/488,243, filed on Apr. 21, 2017.

(51) Int. Cl.
| | |
|---|---|
| *F02D 21/10* | (2006.01) |
| *F02M 23/04* | (2006.01) |
| *F02M 23/00* | (2006.01) |
| *F02B 37/00* | (2006.01) |
| *F01N 3/10* | (2006.01) |
| *F01N 13/10* | (2010.01) |
| *F01N 3/05* | (2006.01) |

(52) U.S. Cl.
CPC .............. *F02D 21/10* (2013.01); *F01N 3/05* (2013.01); *F01N 3/10* (2013.01); *F01N 13/10* (2013.01); *F02B 37/00* (2013.01); *F02M 23/006* (2013.01); *F02M 23/04* (2013.01)

(58) Field of Classification Search
USPC ......... 60/274, 280, 286, 292, 293, 295, 297, 60/301, 303
See application file for complete search history.

(56) References Cited

U.S. PATENT DOCUMENTS

| | | | |
|---|---|---|---|
| 4,570,590 A | 2/1986 | Kawai et al. | |
| 4,732,116 A | 3/1988 | Tanahashi et al. | |
| 6,739,292 B1 | 5/2004 | Neese | |
| 7,007,639 B1 | 3/2006 | Luttgeharm | |
| 7,107,759 B2 * | 9/2006 | Annoura | F02D 41/0032 |
| | | | 123/518 |
| 7,314,043 B1 * | 1/2008 | Berger | F01L 3/06 |
| | | | 123/26 |
| 7,621,256 B2 | 11/2009 | Cunningham et al. | |
| 7,926,271 B2 | 4/2011 | Nemeth et al. | |
| 8,211,300 B2 * | 7/2012 | Partridge | B01D 19/0031 |
| | | | 123/1 A |
| 8,282,528 B2 | 10/2012 | Jager et al. | |
| 8,613,269 B2 | 12/2013 | Shehter et al. | |
| 9,086,021 B2 | 7/2015 | Okumura et al. | |

(Continued)

*Primary Examiner* — Binh Q Tran
(74) *Attorney, Agent, or Firm* — The Weintraub Group, P.L.C.

(57) ABSTRACT

The present invention provides, in an internal combustion engine of the type including: a combustion cylinder having a combustion chamber; an intake port in fluid communication with the combustion chamber; an intake valve for opening and closing the intake port; an exhaust port in fluid communication with the combustion chamber; and an exhaust valve for opening and closing the exhaust portion; the improvement comprising: (a) at least one intake injector disposed within the intake port for injecting a fluid into the combustion chamber; (b) at least one exhaust injector disposed within the exhaust port for injecting a fluid toward the exhaust valve; and (c) means for controlling the at least one intake injector and the at least one exhaust injector.

21 Claims, 5 Drawing Sheets

(56) References Cited

U.S. PATENT DOCUMENTS

| | | | |
|---|---|---|---|
| 2007/0180818 A1* | 8/2007 | Matsuoka | F01N 3/0253 |
| | | | 60/286 |
| 2007/0245719 A1* | 10/2007 | Driscoll | F02D 19/081 |
| | | | 60/286 |
| 2011/0232270 A1* | 9/2011 | Burkitt | F01N 3/0253 |
| | | | 60/286 |
| 2014/0182544 A1 | 7/2014 | Zhou | |
| 2015/0240709 A1* | 8/2015 | Leone | F01N 3/20 |
| | | | 123/25 R |
| 2016/0076488 A1* | 3/2016 | Henry | F01N 3/206 |
| | | | 60/274 |
| 2016/0356211 A1* | 12/2016 | Wicks | F02B 41/04 |

\* cited by examiner

INTERNAL COMBUSTION ENGINE INJECTION SYSTEM

CROSS-REFERENCE TO RELATED APPLICATION

This application is a completion application which claims the priority benefit of U.S. Provisional Patent Application Ser. No. 62/488,243, filed Apr. 21, 2017, for "Internal Combustion Engine Injection System," the entire disclosure of which, including the drawing, is hereby incorporated by reference.

BACKGROUND OF THE INVENTION

1. Field of the Invention

The present invention pertains to internal combustion engines. More particularly, the present invention concerns injection systems for internal combustion engines. Even more particularly, the present invention pertains to an oxidizing fluid injection system for facilitating a more complete fuel burn within an internal combustion engine.

2. Description of Related Art

An internal combustion engine is a heat engine in which fuel combustion within a combustion chamber applies direct force to a component of an engine such as a piston, turbine, blade, rotor, nozzle, or the like. It is this force applied to the component that converts chemical energy from the fuel into useful mechanical energy.

Standard internal combustion engines include a crankshaft that moves a piston between a lowered position and a raised position. The piston is disposed within a combustion cylinder and constrained to only vertical translation. The combustion chamber is defined by the volume between the top of the combustion cylinder and the upper surface of the piston. As the piston moves vertically, the volume of the combustion chamber increases and decreases accordingly. The combustion cylinder includes an intake port and an exhaust port, each opened and closed by an intake valve and an exhaust valve, respectively. A pair of camshafts rotatably connect to the crankshaft via a timing belt, chain, gear, or the like such that the intake valve and the exhaust valve open or close based upon the rotation of the crankshaft and the positioning of the piston.

Most internal combustion engines operate as either a 4-stroke engine or a 2-stroke engine.

In a 4-stroke engine, a complete cycle comprises four stages or "strokes" of the piston. It takes two full rotations of the crankshaft, and thus four strokes of the piston, to complete the four stages. The strokes include: intake; compression; combustion; and exhaust. More specifically, during the intake stroke, the piston lowers and, simultaneously, the intake valve opens to allow an air-fuel mixture to enter the combustion chamber. During the compression stroke, the intake valve closes and the piston raises, thereby compressing the air-fuel mixture at the top of the combustion chamber. During the combustion stroke, a spark plug ignites the air-fuel mixture to produce an expansion which forces the piston back down. Lastly, during the exhaust stroke, the crankshaft raises the piston again and, simultaneously, the exhaust valve opens to allow for the burned air-fuel mixture to be expelled from the combustion chamber.

The primary difference between a 4-stroke engine and a 2-stroke engine is that a 2-stroke engine can complete a full cycle with only one rotation of its crankshaft. As the piston of a 2-stroke engine is in the lowered position, an air-fuel mixture is free to enter and leave the combustion chamber. Thus, a spark plug is able to ignite the mixture each time the piston is in the raised position, thereby doubling the number of combustions per crankshaft rotation.

In either a 2-stroke or a 4-stroke engine, fuel may enter the combustion chamber as an air-fuel mixture through the intake port or, alternatively, highly pressurized fuel may be injected directly into the combustion chamber and then become admixed with injected air. Oftentimes, fuel within the combustion chamber is left unburned due to an inefficient ratio of air to fuel supplied to the combustion chamber, which results in shorter burn times. The length of time for each burn is directly correlated to the RPM of the engine. At a low RPM, the length of time provided to burn the fuel is approximately 0.01 seconds. This is not enough time for the fuel to completely burn. At a higher RPM, the fuel burns for only 0.001 seconds. As a result of this inefficient mixture and short burn times, the engine produces higher emissions including hydrocarbons, carbon monoxide, carbon dioxide, and other pollutants.

Direct injection typically encourages an ultra-lean burn which reduces emission levels at low loads. A "lean mixture" refers to an excess of air in a mixture which creates a lean-burn. In a lean-burn engine, the amount of air is increased and more fuel is combusted. This leads to the emission of fewer hydrocarbons.

Overheating of the combustion cylinder increases the possibility that the fuel might ignite prematurely. Therefore, water may also be injected into the combustion chamber in order to cool certain parts of the combustion cylinder.

Systems for injecting additional amounts of fresh air into a combustion chamber of an internal combustion engine is well known such as those taught in U.S. Pat. No. 4,732,116 to Tanahashi et al., U.S. Pat. No. 4,570,590 to Kawai et al., U.S. Pat. No. 6,739,392 to Neese, U.S. Pat. No. 7,007,639 to Luttgeharm, U.S. Pat. No. 7,621,256 to Cunningham et al., U.S. Pat. No. 7,926,271 to Nemeth et al., U.S. Pat. No. 8,282,528 to Jager et al., U.S. Pat. No. 8,613,269 to Shehter et al., U.S. Pat. No. 9,086,021 to Okumura et al., and U.S. Patent Application Publication No. 2014/0182544 to Zhou.

Each of the references taught therein teaches a system for injecting additional amounts of air, either alone or as part of an air-fuel mixture, into a combustion chamber in order to facilitate a more complete and efficient burn. However, these references fail to teach air being injected into the exhaust of the engine in order to flush the exhaust of the burned fuel exiting the combustion chamber and reduce exhaust emissions.

It is to this to which the present invention is directed.

SUMMARY OF THE INVENTION

The present invention provides, in an internal combustion engine of the type including: a combustion cylinder having a combustion chamber; an intake port in fluid communication with the combustion chamber; an intake valve for opening and closing the intake port; an exhaust port in fluid communication with the combustion chamber; and an exhaust valve for opening and closing the exhaust port, the improvement comprising:

(a) at least one intake injector disposed within the intake port for injecting a fluid into the combustion chamber;

(b) at least one exhaust injector disposed within the exhaust port for injecting a fluid toward the exhaust valve; and (c) means for controlling the at least one intake injector and the at least one exhaust injector.

Regardless of whether the internal combustion engine used herewith is a 2-stroke or a 4-stroke engine, it is to be understood that the at least one intake injector only operates when the intake valve is open to inject a fluid into the combustion chamber. The fluid is an oxidizing fluid, such as water, oxygen, or the like, to create a more complete fuel burn. Preferably, the fluid injected into the combustion chamber via the intake injector is fresh air. Thus, fresh air injected into the combustion chamber creates a lean-burn by employing a greater than stoichiometric proportion of fluid to fuel in order to ensure that more fuel is combusted.

Preferably, multiple intake injectors are disposed within the intake port. When multiple intake injectors are employed, they are each disposed on a different axis in order to disperse air in various directions throughout at least a substantial portion of the combustion chamber.

As noted above, at least one exhaust injector is disposed within the exhaust port and directed toward the exhaust valve. Any additional exhaust injectors inject fluid toward an exhaust manifold and away from the combustion chamber in order to flush out the exhaust port. The exhaust injector injects an oxidizing fluid such as water, oxygen, or the like. Preferably, the fluid emitted from the exhaust injector is fresh air.

Additionally, multiple exhaust injectors may be disposed within the exhaust port and positioned on different axes in order to disperse air throughout at least a substantial portion of the exhaust port, the exhaust manifold, and the exhaust pipe.

For a better understanding of the present invention, reference is made to the accompanying drawing and detailed description. In the drawing, like reference numerals refer to like parts through the several views, in which:

DETAILED DESCRIPTION OF THE INVENTION

As noted above, the present invention may be used in combination with either a 2-stroke and 4-stroke engine which directly injects fuel or an air-fuel mixture into a combustion chamber of a combustion cylinder. However, the present invention will be described throughout the ensuing description as being used in combination with a 4-stroke engine injecting an air-fuel mixture into the combustion chamber without limiting the scope thereof. Moreover, it is to be understood that the present invention may be used in any piston engine in an automobile, including diesel, turbo, supercharged, or any other suitable vehicle.

As will be described in detail below, the critical aspect of the present invention is the provision of at least one intake injector being used in combination with at least one exhaust injector for facilitating a more complete fuel burn within an internal combustion engine. This improves the overall life of the engine and improves engine efficiency.

Now, with reference to any one of FIGS. 1-4 of the drawing, the present invention provides an engine 10 of the type including: (a) a combustion cylinder 13 having a combustion chamber 18; (b) an intake port 14B formed in the combustion cylinder 13 and in fluid communication with the combustion chamber 18; (c) an intake valve 14A for opening and closing the intake port 14B; (d) an exhaust port 14E formed in the combustion cylinder 13 and in fluid communication with the combustion chamber 18; and (e) an exhaust valve 14D for opening and closing the exhaust port 14E.

Used in combination with the engine 10, the present invention provides the improvement comprising: (a) at least one intake injector 20 disposed within the intake port 14B; (b) at least one exhaust injector 24 disposed within the exhaust port 14E; and (c) means 30 for controlling the at least intake injector 20 and the at least one exhaust injector 24.

With more particularity, and in accordance with the present invention, the internal combustion engine 10 hereof, generally, comprises the combustion cylinder 13 including the combustion cylinder body 16, the combustion chamber head 14, and the piston 18. A crankshaft 18D extends through a lower portion of the combustion cylinder 13 and is rotatably connected thereto for controlling vertical movement of the piston 18. A connecting rod 18C rotatably connects the piston 18 to the crankshaft 18D to facilitate vertical movement of the piston 18. Thus, rotation of the crankshaft 18D causes the connecting rod 18C to actuate the piston 18, which is confined by the combustion cylinder body 16, to translate vertically.

A space between the upper surface of the piston 18 and the combustion cylinder head 14 defines the combustion chamber 16A. The combustion chamber 16A fluctuates in volume as the crankshaft 18D alternates the piston 18 between an upper and a lower position.

An intake port 14B is formed within the combustion cylinder head 14 providing a passageway for an air-fuel mixture to be directed into the combustion chamber 16A.

As noted above, at least one intake injector 20 is mounted within the intake port 14B. The intake injector 20 is angularly disposed within the intake port 14B in order to direct a fluid into the combustion chamber 16A. The intake injector 20 may either be mounted directed to the combustion cylinder head 14. Alternatively, a bushing 19 may be used to secure the intake injector 20 to the intake port 14B. Preferably, the bushing 19 is mounted to the intake port 14B at the opening of the intake port 14B, or the outside thereof, opposite the intake valve 14A. The bushing 19 is a metal lining secured within the intake port 14B for angularly positioning and securing the intake injector 20 therein. The intake injector 20 includes an orifice 21 aimed into the intake port 14B for directing the fluid therein.

The orifice 21 has a diameter directly proportionate to the volume of the engine 10. Preferably, the diameter of the orifice 21 is about 0.018 thousandths of an inch.

The fluid injected by the intake injector 20 is an oxidizing fluid such as oxygen, hydrogen peroxide, water, or any other oxidizing chemical product with water. Preferably, the fluid is oxygen or fresh air. Therefore, throughout the present invention, all reference to an injected oxidizing fluid will be referred to as "air."

In use, air is injected into the combustion chamber 16A at a pressure of from about 30 psi to about 80 psi.

In a high-pressure system, the air is injected at a pressure of from about 40 psi to about 80 psi in order to reach the far, opposite end of the combustion chamber 16A. Alternatively, in a low-pressure system, air may be injected at a pressure of from about 30 psi to about 50 psi.

An intake air pump 22 supplies fresh air to the at least one intake injector, when necessary. Any suitable air pump, such as a pneumatic pump, a hydraulic pump, or the like, which can supply the necessary pounds per square inch of air to the intake injector 20 may be used. Such air pumps are well known and commercially available. Alternatively, a fluid source (not shown) may be provided to supply an oxidizing fluid to the intake injector 20 by being in fluid communication therewith via any suitable conduits, tubing, or the like.

The engine 10 further includes means 30 for controlling the activation and deactivation of the intake injector 20 at specific times. The control means 30 comprises any well-known mechanical arrangement, such as a rotary actuator or motor, or any suitable electronic computing device to activate the intake injector 20 when the intake port 14B is opened and deactivate the intake injector 20 when the intake port 14B is closed.

Preferably, the engine 10 comprises a plurality of intake injectors 20 angularly disposed within the intake port 20. As shown, three intake injectors 20 are disposed within the intake port 20, each at a different axis, angular position, and proximity to the combustion chamber 16A with respect to one another. However, it is to be understood that any number of intake injectors 20 may be employed. Preferably, the intake injectors 20 are angularly secured to the bushing 19, and equidistantly spaced apart thereon, in order to position the intake injectors 20 within the same axial plane, but at different angles. This ensures that a larger area of the combustion chamber 16A is filled with fresh air, thereby oxidizing more of the fuel within the combustion chamber 16A.

As noted above, the engine 10 further comprises an intake valve 14A extending through the combustion cylinder head 14. The intake valve 14A closes the intake port 14B and restricts the flow of the air-fuel mixture into the combustion chamber 16A. An intake camshaft 18A is rotatably connected to the crankshaft 18D via a timing belt, chain, gear, or the like for operating the intake valve 14A. Because the intake camshaft 18A rotates at the same rate as the crankshaft 18D, the opening and closing of the intake port 14B is specifically timed with respect to movement of the piston 18, as discussed below.

Similarly, an exhaust port 14E is formed within the combustion cylinder head 14, opposite the intake port 14B, for directing the burnt air-fuel mixture out of the combustion chamber 16A and into an exhaust manifold 28, discussed below.

As noted above, at least one exhaust injector 24 is mounted within the exhaust port 14E. Preferably, and as shown, the exhaust injector 24 is angularly disposed within the exhaust port 14E in order to direct an oxidizing fluid toward the exhaust valve 14A and combustion chamber 16A. The exhaust injector 24 may either be mounted directly to the combustion cylinder head 14 or a bushing 23 located on the outside of the exhaust port 14E or between the exhaust port 14E and the exhaust manifold 28. The exhaust injector 24 can be built or manufactured in the exhaust port 14E or the exhaust manifold 28 for securing the exhaust injector 24 thereto.

The exhaust injector 24 includes an orifice 25 directed toward the exhaust valve 14D. The orifice 25 has a diameter of 0.093 thousandths of an inch on a test engine with a displacement of 79 cc. On larger cubic inch engines, the orifice 25 of the exhaust injector 24 is calculated from the test engine. Fresh air, water, or any other suitable oxidizing chemicals may be used to clean the exhaust port 14E and oxidize unburned fuel exiting the exhaust port 14E. When fresh air is injected into the exhaust port 14E toward the exhaust valve 14E, air is injected at a pressure of from about 10 psi to about 40 psi. Preferably, air is injected at a pressure of from about 20 psi to about 40 psi.

When the exhaust valve 14E is closed, a buildup of continuous air is injected in the exhaust port 14E and oxidizes any fuel entering the exhaust port 14E once the exhaust valve 14D begins to open.

Moreover, instead of positioning the exhaust injector 24 directly within the exhaust port 14E, the exhaust injector 24 may be disposed within the exhaust manifold 28, itself, to direct fresh air further into the exhaust manifold 28. This ensures that all fuel entering the exhaust manifold 28 is oxidized.

An exhaust pump 26 may be provided in order to supply the exhaust injector 24 with fresh air. Alternatively, it is to be understood that the intake pump 22 may be configured to supply both the intake injector 20 and the exhaust injector 24 with fresh air, thereby utilizing only a single pump. In order to do so, it is understood that the intake pump 22 is in fluid communication with the intake and exhaust injectors 20, 24. A fluid source (not shown) may also be provided to supply the exhaust injector 24 with an oxidizing fluid other than fresh air.

Furthermore, the control means 30 discussed above is in either electrical or mechanical communication with the at least one exhaust injector 24 to control the activation and deactivation thereof. Preferably, the exhaust injector 24 is only activated when the exhaust port 14E is opened and fuel flows out of the combustion chamber 16A. Thus, the exhaust injector 24 is, preferably, deactivated when the exhaust port 14E is closed. However, the exhaust injector 24 may run continuously when the exhaust port 14E is closed in order to clean the exhaust of any remaining, unburned fuel particulates. Running the exhaust injector 24 continuously creates an air bubble at the exhaust valve 14D. As a result, when the exhaust valve 14D begins to open, the fuel contacts the air bubble and maintains the burning of any unburned fuel.

Preferably, a plurality of exhaust injectors 24 are angularly disposed within the exhaust port 14E, each directing the flow of air away from the combustion chamber 16A and into the exhaust manifold 28.

As shown, there are three exhaust injectors 24 positioned at various angular positions within the exhaust port 14E in order to ensure that air is injected throughout at least a substantial portion of the exhaust port 14E. However, it is to be understood that any number of exhaust injectors 24 may be employed. Preferably, the exhaust injectors 24 are angularly secured to the bushing 23 in order to position the exhaust injectors 24 within the same axial plane, but at different angles. Each exhaust injector 24 is directed toward either the combustion chamber 16A or the exhaust manifold 28 for oxidizing unburned fuel throughout the exhaust port 14E.

As noted above, at least one exhaust injector 24, either in lieu of or in addition to those disposed within the exhaust port 14E, may be disposed within the exhaust manifold 28 to oxidize fuel once the fuel exits the exhaust port 14E or the exhaust valve 14D.

The exhaust port 14E extends through the combustion cylinder head 14. The exhaust valve 14D closes the exhaust port 14E and restricts the flow of the burnt air-fuel mixture therein from the combustion chamber 16A. An exhaust camshaft 18B is rotatably connected to the crankshaft 18D via a timing belt, chain, gear, or the like for operating the exhaust valve 14D. Because the exhaust camshaft 18B rotates at the same rate as the crankshaft 18D, the opening and closing of the exhaust port 14E is specifically timed with respect to the piston 18, as discussed below.

The engine 10 further comprises a spark plug 14C for igniting the air-fuel mixture within the combustion chamber 16A during the compression stroke.

Figure 5:
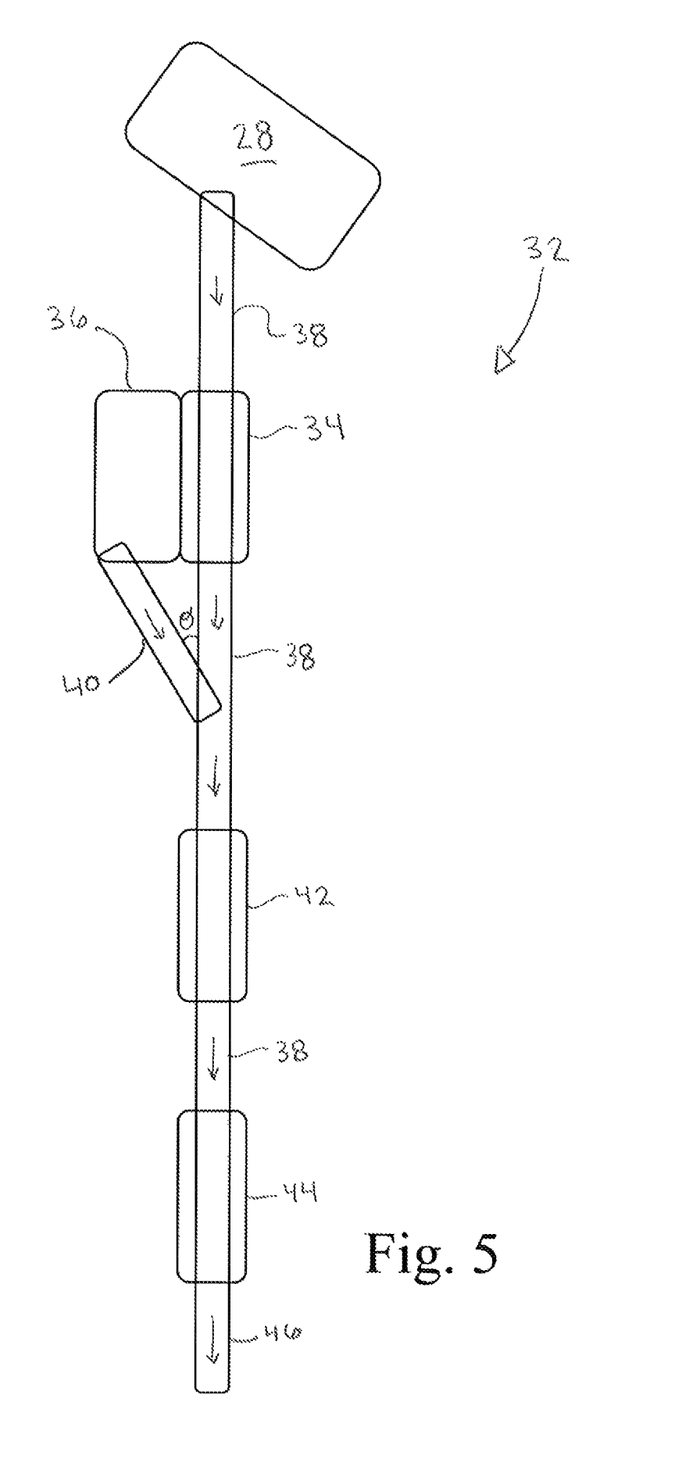
FIG. 5 is a schematic view of an exhaust system used in combination with the engine hereof.

As shown in FIG. 5, it is to be understood that the engine 10 hereof further includes an exhaust system 32 for directing the burnt fuel mixture out of the engine 10. The exhaust system 32 comprises the exhaust manifold 28, a turbocharger 34 including an air pump 36, a catalytic converter 42, and a muffler 44. An exhaust pipe 38 interconnects the exhaust manifold 28 to the turbocharger 34 and extends therethrough. The exhaust pipe 38 further interconnects the turbocharger 34 to the catalytic converter 42. The exhaust pipe 38 further extends through the catalytic converter 42 for connecting the muffler 44 thereto. A tailpipe 46 extends from the muffler 44 downstream of the catalytic converter for directing exhaust gases away from the engine 10.

The air pump 36 of the turbocharger 34 includes a connecting pipe 40 for injecting fresh air from about 3 pounds to about 30 pounds into the exhaust pipe 38 at about 12 inches downstream of the turbocharger 34. The connecting pipe 40 functions to further cleans up and dilute the burnt mixture within the exhaust pipe 38. Preferably, the connecting pipe 40 is about 1 inch, but larger pipes may be used.

Exemplary Use

As is well known with standard 4-stroke engines and as noted above, the internal combustion engine 10 described hereinabove operates between four stages or "strokes": intake; compression; combustion; and exhaust. In use and as described with regards to each of the four stages below, the intake injectors 20 and the exhaust injectors 24 are specifically actuated based on the stage of the engine 10 or stroke of the piston 18.

Intake Stroke

Figure 1:
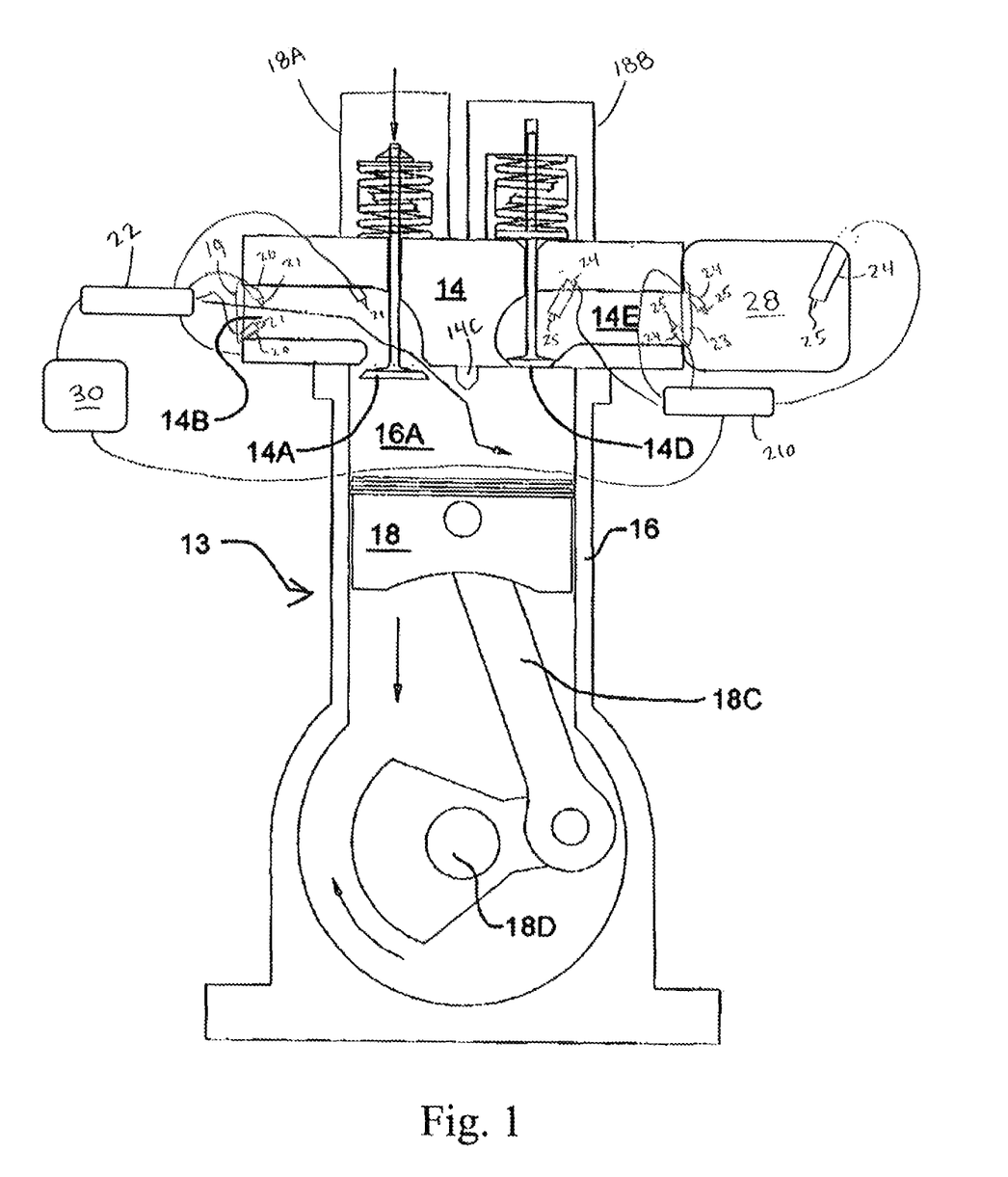
FIG. 1 is a cross-sectional front view of an internal combustion engine in accordance with the present invention during an intake stroke.

As shown in FIG. 1, the intake camshaft 18A rotates, thereby opening the intake valve 14A so that an air-fuel mixture can flow into the combustion chamber 16A. Simultaneously, the piston 18 moves downward to increase the volume of the combustion chamber 16A and provide a larger area for the air-fuel mixture to flow into. Either before the intake port 14B opens or soon after, the control means 30 activates the intake pump 22 and the intake injectors 20, either directly or indirectly, in order to inject additional amounts of fresh air into the combustion chamber 16A. Air may be injected at either a continuous or variable rate. Preferably, air is injected at about 60 psi. This addition of fresh air creates an above stoichiometric, ultra-lean mixture within the combustion chamber 16A on top of the piston 18.

Compression Stroke

Figure 2:
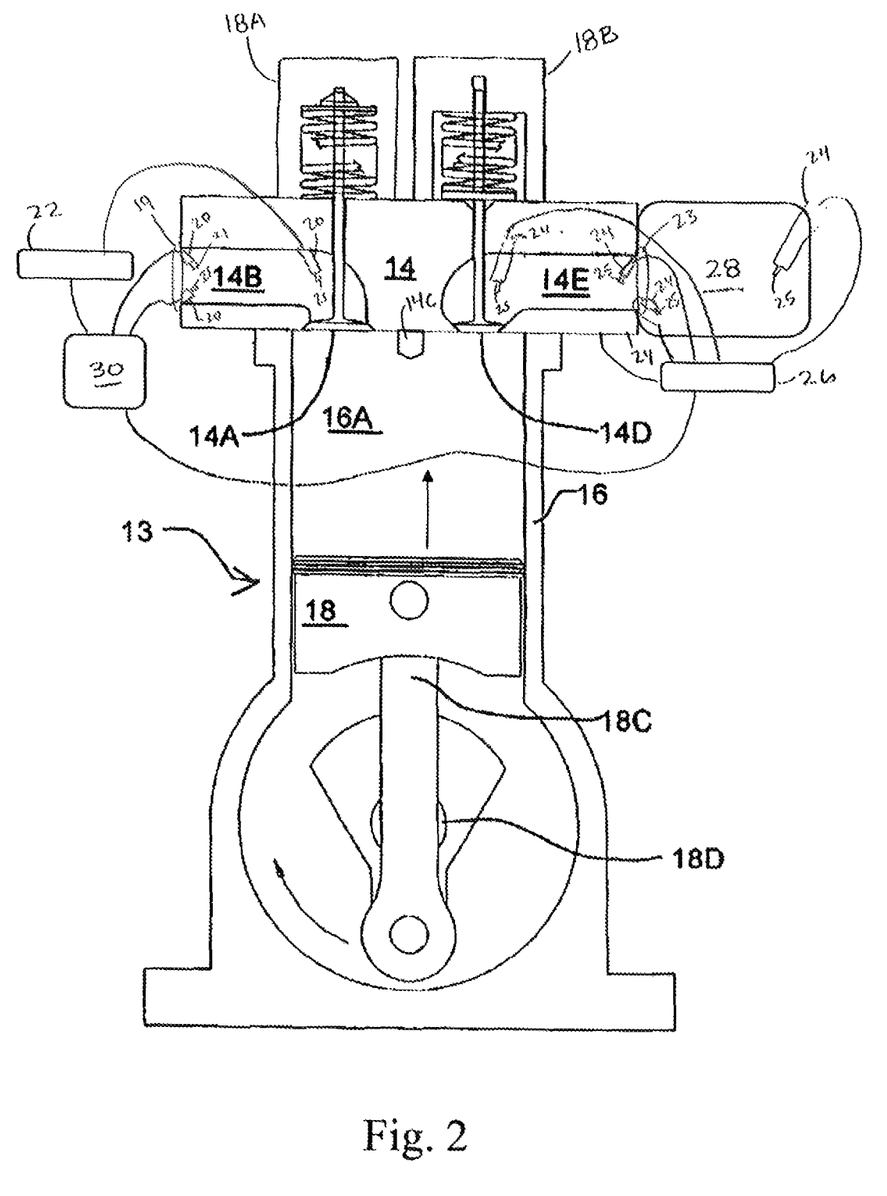
FIG. 2 is a cross-sectional front view of the internal combustion engine hereof during a compression stroke.

Referring to FIG. 2, the engine 10 is beginning the compression stroke. As the piston 18 reaches the lower end of the combustion cylinder 13, the intake valve 14A closes to restrict the flow of additional air and fuel into the combustion chamber 16A. Thereafter, the crankshaft 18D rotates in order to raise the piston 18, thereby compressing the air-fuel mixture toward the top of the combustion chamber 16A. Here, the injected air is not completely mixed with the air-fuel mixture until the mixture is ignited.

Combustion Stroke

Figure 3:
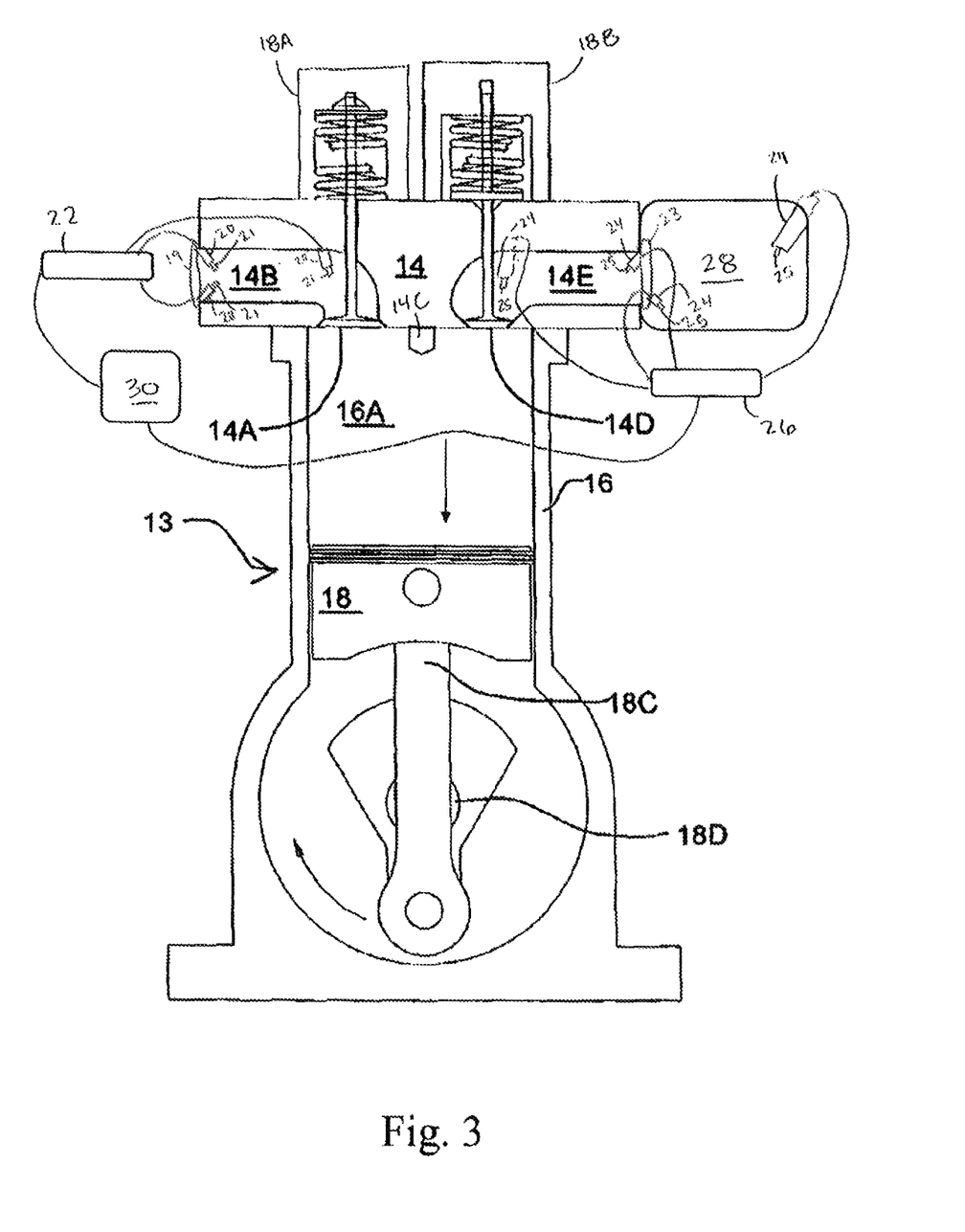
FIG. 3 is a cross-sectional front view of the internal combustion engine hereof during a combustion stroke.

FIG. 3 shows the spark plug 14C being activated during the combustion stroke which, in turn, ignites the air-fuel mixture compressed within the combustion chamber 16A. This ignition causes the fuel therein to combust and expand, which forces the piston 18 downwardly toward the bottom of the combustion cylinder 13.

Exhaust Stroke

Figure 4:
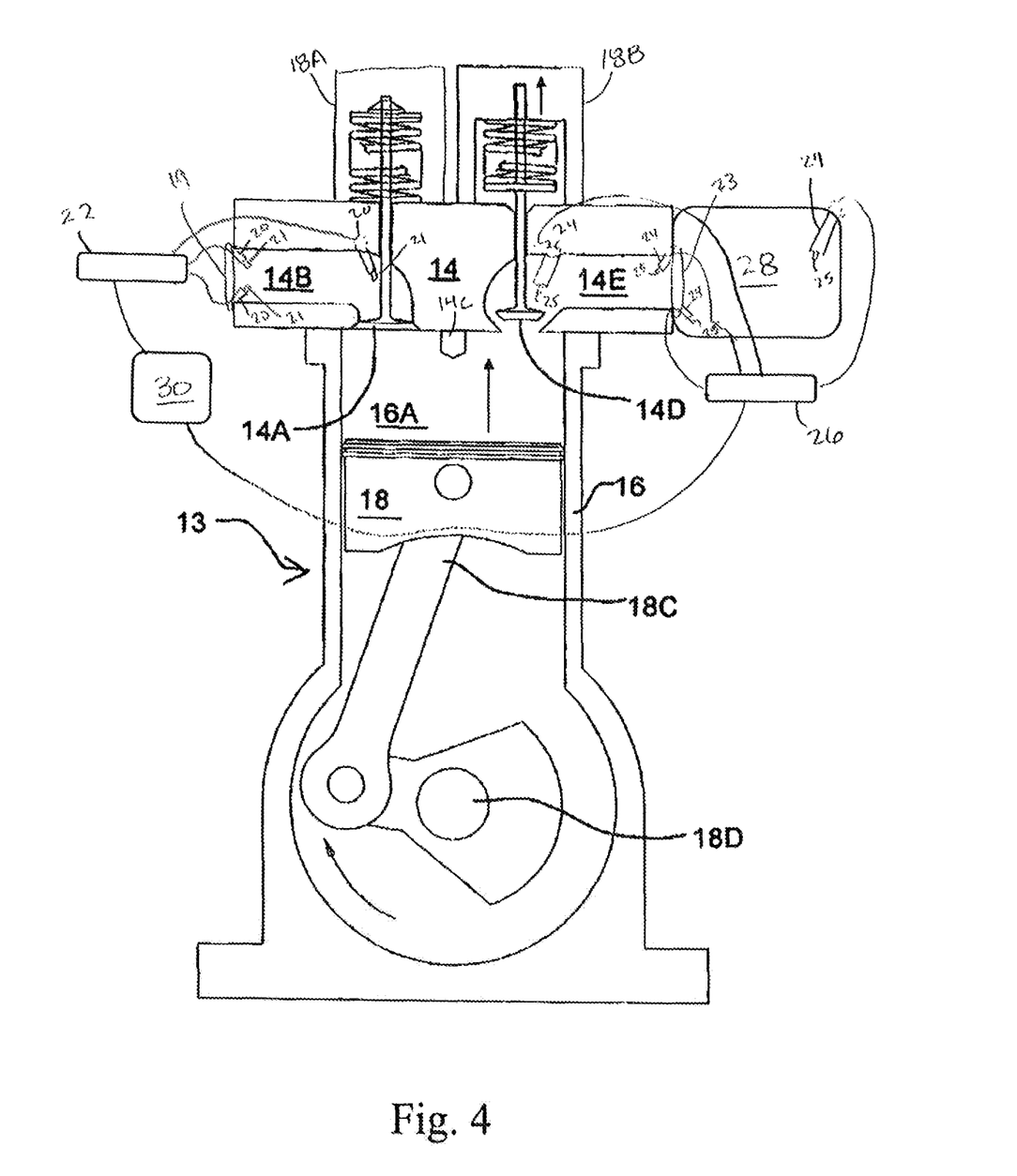
FIG. 4 is a cross-sectional front view of the internal combustion engine hereof during an exhaust stroke.

Lastly, as shown in FIG. 4, the exhaust camshaft 18B causes the exhaust valve 14D to open the exhaust port 14E. Thus, as the piston 18 moves upwardly toward the top of the combustion cylinder 13, the ignited fuel is forced out of the combustion chamber 16A through the open exhaust valve 14D. The control means 30 then activates the exhaust pump 26 or the exhaust injectors 24, either directly or indirectly, in order to inject additional amounts of fresh air into the exhaust port 14E and exhaust manifold 28. Preferably, air is injected at about 20 psi. This ensures a more complete fuel burn of any unburned fuel to reduce emissions. Moreover, the air injected into the exhaust port 14E and exhaust manifold 28 by the exhaust injectors 24 cleans the exhaust manifold 28 of any remaining unburned fuel particulates.

Once the unburned fuel is removed from the combustion chamber, the exhaust valve 14D is closed and the cycle restarts with the intake stroke again. However, as noted above, the exhaust injectors 24 may continue to supply air to the exhaust port 14E to ensure no unburned fuel remains therein.

EXAMPLE

The main purpose of the present invention, as disclosed hereinabove, is to burn more unburned fuel in order to clean the air and the exhaust exiting the internal combustion engine 10. The test engine 10 is a 79 cc four stroke over head valve internal combustion carburetor engine.

On the intake stroke, the intake injector with a 0.018 thousandths of an inch diameter provides a continuous flow of air to create an air bubble when the intake valve 14A is closed. As soon as the intake valve 14A begins to open, this fresh air is drawn into the combustion chamber 16A above the piston 18. As the air-fuel mixture from the carburetor is drawn into the combustion chamber 16A, the 0.018 thousandths of an inch intake injector injects fresh air at from about 40 pounds to about 60 pounds to the far side of the combustion cylinder 13 past the intake valve 14A. This helps to completely fill the combustion cylinder 13 or the combustion chamber 16A with air.

On the compression stroke, the fresh air above the piston 18 and the injected air on the far side of the combustion cylinder 13 do not readily mix with the air-fuel mixture. However, the spark plug 14C will ignite the rich mixture. Thereafter, the fresh air will mix with the ignited mixture, thereby producing a more complete burn.

On larger cubic inch engines, one will have to calculate the intake injectors from the test engine (79 cc) in order to reach the desired diameter thereof to get the best performance and cleanest burn.

After the combustion stroke, the exhaust valve 14D will begin to open as the piston 18 starts to move upwardly. The ignited mixture and the high pressure within the combustion cylinder 13 will then begin to leave the combustion chamber 16A, thereby expelling burning hot gases into the fresh air of the exhaust port 14E in order to continue the burn. With more fresh air provided in the exhaust port 14E, the unburned fuel will be burned. Additional exhaust injectors 24 located in the exhaust manifold 28 and the exhaust pipe 38 will keep the unburned fuel burning for as long as possible.

The test engine hereof includes at least one exhaust injector at 0.093 thousandths of an inch in diameter continually injects fresh air on the exhaust valve 14D at from about 20 pounds to about 40 pounds in order to form an air bubble in the exhaust port 14E. On larger cubic inch engines, the orifice of the 0.093 thousandths of an inch exhaust injector 24 will have to be larger and calculated from the size of the test engine.

After the exhaust gases leave the exhaust manifold 28 and enter the exhaust pipe 38, the turbocharger 34 can be used to inject more fresh air into the exhaust pipe 38 downstream of the turbocharger 34. It is well known that a turbocharger produces less air when less fuel is used, as is the case when the vehicle is cruising, not accelerating, or pulling a load. When more fuel is used, a turbocharger produces a larger volume of air at a higher pressure to dilute the exhaust gases in the exhaust pipe 38 downstream of the turbocharger 34. This produces a cleaner exhaust at the tailpipe 46. As a result, this causes more fuel to be burned and, effectively, the turbocharger 34 produces more clean air.

As noted above, a 1 inch or longer connecting pipe 40 connects air pump 36 of the turbocharger 34 to the exhaust pipe 38. Preferably, the connecting pipe 40 is connected to the exhaust pipe 38 about 12 inches downstream of the turbocharger 34. The connecting pipe 40 is connected to the exhaust pipe 38 at an angle Θ of about 30 degrees with respect thereto.

The additional fresh air being injected will dilute the exhaust gases. Thus, when the exhaust gases leave the tailpipe 46 or the exhaust system 32, the exhaust gases will be cleaner. Where headers are used, the engine 10 on the exhaust stroke will be the same as the exhaust manifold 28 and the exhaust pipe 38, with the exception of after the collector where the headers converge to form a single exhaust pipe 38. The turbocharger 34 or other air pumps can then be installed. It may be preferable to include an additional V6 or V8 turbo.

On the test engine running at 3,000 RPM with no fresh air injected, the exhaust temperature was 300° F. Running the test engine at 3,000 RPM with an exhaust injector nozzle of 0.093 thousandths of an inch at 20 pounds of pressure and continuously injecting fresh air on the exhaust valve 14D in the exhaust port 14E, the exhaust temperature was 600° F. An increase in exhaust temperature means that more fuel was burned.

Where a turbocharger 34 or turbo is used, other pumps could be used as well, such as an electrically driven, supercharged, or any other well-known and commercially available air or fluid pumps.

To, once again, reiterate the operation of the engine 10 hereof, the following is provided as a detailed description of the engine 10 in use, specifically during the intake stroke. The test engine is a 79 cc, 4 cycle overhead valve carburetor internal combustion engine. On the intake stroke, one injector can be installed into the head or in the intake manifold. More than one can be used, but only one is preferred. As the intake valve starts to open, the fresh air injector has been injecting fresh air on the intake valve continually at about 40 pounds to about 60 pounds through a 0.18 thousandth orifice. As the intake valve starts to open, the bubble of fresh air is pulled and injected into the cylinder on top of the piston. As the piston continues down, air is pulled from the intake manifold to fill the cylinder. At the same time, the inject injector or injectors are injecting air into the cylinder in order to fill the cylinder completely.

On a direct port injecting system, the fuel is injected as the air is being pulled past the intake valve. Most internal combustion engines use the direct port injecting system. The first bubble of air on top of the piston does not mix completely with the air coming from the intake manifold. The direct port injector is computer controlled to inject the correct amount of fuel depending on the load on the engine at idle, full throttle or throughout the range of power needed. When the piston reaches the bottom of the intake stroke, the intake valve closes.

On the compression stroke, as the piston nears the top of the head, the rich fuel mixture is ignited by a spark plug. This ball of fire then mixes with the lean air on top of the piston to create a more complete burn.

On the power stroke, when the piston reaches the bottom of the stoke, the fire ball is still burning. This is when the exhaust stroke starts and the exhaust valve starts to open. Thereafter, the fire ball starts to leave the exhaust valve and enter the exhaust port.

The major problem of an internal combustion engine is the short time of burn of the air fuel mixture. At a lower RPM, the time of burn is 0.01 hundredth of a second. This short time of burn creates a lot of pollution including carbon monoxide, carbon, hydrocarbons, carbon dioxide, and many others. The air pump used to produce the about 40 to about 60 pounds of fresh air can be electric, belt driven, or other commercially available pump designed to deliver the necessary air pressure. On a larger cc or cubic inch engine, the fresh air injector can be calculated from the test engine and will have to have a larger orifice.

It is to be understood that the term "air" is to be interpreted as any other fluids which can be used to ignite the burn such as oxygen, water, and the like.

After the exhaust stroke, when the exhaust valve closes and the piston starts to go down, the intake stroke starts again.

The following is used to reiterate the operation of the engine 10 hereof with regards to the exhaust stroke. The main purpose of the present invention is to burn more unburnt fuel in the exhaust system of an internal combustion engine so the exhaust leaving the exhaust system is free of most pollution. The most important part of this fresh air injection system and the present invention hereof is the exhaust system which includes the exhaust gases leaving the exhaust valve and travel through the exhaust manifold, the exhaust pipe, the turbocharger, the catalytic converter, the muffler, and the tailpipe, in that order.

The following is a description of the aforementioned chain of events during the exhaust stroke as soon as the exhaust valve starts to open and the exhaust injector or injectors have been injecting fresh air on the exhaust valve to form a bubble of fresh air. When the red hot gases start to leave the exhaust valve, then the gases enter the bubble of fresh air continuing the burn of unburnt exhaust gases.

A bushing is disposed between the head and the exhaust manifold with an injector or injectors injecting fresh air into the exhaust gases into the exhaust manifold. Preferably, there is a third set of injectors in another bushing between the exhaust manifold and exhaust pipe injecting more fresh air into the exhaust gases leaving the exhaust manifold and entering the exhaust pipe. As the exhaust gases are traveling down the exhaust pipe, there is a turbocharger being driven by the exhaust gases. The turbo drives an air pump that, through a one inch or larger pipe, injects fresh air downstream from the turbocharger into the exhaust pipe about 12 inches downstream from the turbocharger depending on the room available. This one inch or larger pipe should be located before the catalytic converter forcing fresh air into the exhaust gases in the exhaust pipe in order to dilute the exhaust gases even more.

Preferably, the turbocharge is used over other air pumps because the turbo can produce a high volume of air from a few pounds per square inch to over 30 pounds per square inch with no drag on the engine. When the engine is under low load, the turbocharger produces less pressure with still a high volume of air. Under accelerating or high load on the engine, the turbocharger produces higher pressure and still high volume of fresh air to dilute the exhaust gases even more. As the exhaust gases leave the exhaust system and tailpipe, the diluted exhaust gases will be clear of most pollution entering the outside air.

As stated before, the test engine is a 79 cc, 4-stroke overhead valve carburetor internal combustion engine. The injector used had a 0.093 thousandth orifice injecting fresh air on the exhaust valve continuously forming a bubble of fresh air around the exhaust valve at about 20 pounds to about 40 pounds of pressure per square inch.

Running the test engine at about 3000 RPM without injecting fresh air, the exhaust temperature leaving the exhaust pipe and muffler at about nine inches from the head or exhaust port was about 300° Fahrenheit. After injecting fresh air on the exhaust valve, the exhaust temperature was about 600° Fahrenheit. Thus, the fresh air being injected continued the burn of the red hot gases leaving the exhaust valve.

The second set of injectors and third set of injectors are used to continue the burn as long as possible. On larger cc or cubic inch internal combustion engines, the size of the injector orifice can be calculated from the test engine and will have to be larger for every single piston or cylinder displacement.

It is to be understood that the term "air" is to be interpreted as any other fluids which can be used to ignite the burn such as oxygen, water, and the like.

From the above, it is to be appreciated that defined herein is a new and unique internal combustion engine for creating a more complete fuel burn and a cleaner exhaust emission therefrom.

LIST OF REFERENCE NUMERALS

10 Internal combustion engine
13 Combustion cylinder
14 Combustion cylinder head
14A Intake valve
14B Intake port
14C Spark plug
14D Exhaust valve
14E Exhaust port
16 Combustion cylinder body
16A Combustion chamber
18 Piston
18A Intake camshaft
18B Exhaust camshaft
18C Connecting rod
18D Crankshaft
19 Bushing
20 Intake injector
21 Intake injector orifice
22 Intake air pump
23 Bushing
24 Exhaust injector
25 Exhaust injector orifice
26 Exhaust air pump
28 Exhaust manifold
30 Control system
32 Exhaust system
34 Turbocharger
36 Air pump of turbocharger
38 Exhaust pipe
40 Connecting pipe
42 Catalytic converter
44 Muffler
46 Tailpipe

Having thus described the invention, what is claimed is:

1. In an internal combustion engine of the type including: a combustion cylinder having a combustion chamber; an intake port in fluid communication with the combustion chamber; an intake valve for opening and closing the intake port; an exhaust port in fluid communication with the combustion chamber; and an exhaust valve for opening and closing the exhaust port, the improvement comprising:
   (a) a plurality of intake injectors, each one of the plurality of intake injectors on a different axis and disposed within the intake port for injecting air into the combustion chamber;
   (b) a plurality of exhaust injectors for injecting air into the combustion chamber, each one of the plurality of exhaust injectors disposed within the exhaust port on a different axis; and
   (c) means for controlling the at least one intake injector and the at least one exhaust injector.

2. The improvement of claim 1 wherein the injectors are directed toward the intake valve.

3. The improvement of claim 1 further comprising:
   a bushing disposed on the outside of the intake port; and
   wherein each one of the plurality of intake injectors is mounted to the bushing.

4. The improvement of claim 1 wherein the each injector includes an orifice, the orifice being 0.018 thousandths of an inch in diameter.

5. The improvement of claim 1 wherein the injectors are directed toward the exhaust valve.

6. The improvement of claim 1 wherein the injectors are directed away from the exhaust valve.

7. The improvement of claim 6 further comprising:
   a bushing disposed between the exhaust port and the exhaust manifold; and wherein each one of the plurality of exhaust injectors is mounted to the bushing.

8. The improvement of claim 1 wherein each injector includes an orifice, the orifice being 0.093 thousandths of an inch in diameter.

9. The improvement of claim 1 further comprising:
   (a) an intake air pump for providing the air to the injectors;
   (b) an exhaust air pump for providing the air to the injectors; and
   wherein the means for controlling the at least one intake injector and the at least one exhaust injector is an electronic computing system, the electronic computing system being in communication with the intake air pump, the at least one intake injector, the exhaust air pump, and the at least one exhaust injector.

10. The improvement of claim 9 wherein the electronic computing system operates the intake injector and the exhaust injector to inject air only when the intake valve and the exhaust valve are open.

11. The improvement of claim 9 wherein the electronic computing system operates the intake injector and the exhaust injector to inject air continuously.

12. The improvement of claim 1 further comprising:
(a) an exhaust manifold;
(b) a turbocharger including an air pump, the turbocharger being in fluid communication with the exhaust manifold;
(c) a catalytic converter being in fluid communication with the turbocharger;
(d) an exhaust pipe interconnecting the exhaust manifold, the turbocharger, and the catalytic converter;
(e) a connecting pipe having a first end and a second end, the first end of the connecting pipe extending from the air pump of the turbocharger, the second end of the connecting pipe connecting to the exhaust pipe downstream of the turbocharger, the connecting pipe intersecting the exhaust pipe at about a 30-degree angle.

13. The improvement of claim 12 wherein the connecting pipe intersects the exhaust pipe at about 12 inches downstream of the turbocharger.

14. The improvement of claim 12 wherein the at least one exhaust injector is disposed within the exhaust manifold and directed toward the exhaust pipe.

15. In an internal combustion engine of the type including a combustion cylinder having a combustion chamber; an intake port in fluid communication with the combustion chamber, an intake valve for opening and closing the intake port; an exhaust port in fluid communication with the combustion chamber; and an exhaust valve for opening and closing the exhaust port, the improvement comprising:
(a) at least one intake injector disposed within the intake port for injecting air into the combustion chamber;
(b) at least one exhaust injector disposed within the exhaust port for injecting air toward the exhaust valve; and
(c) means for controlling the at least one intake injector and the at least one exhaust injector;
(d) an intake air pump for providing the air to the at least one intake injector;
(e) an exhaust air pump for providing the air to the at least one exhaust injector; and
wherein the means for controlling the at least one intake injector and the at least one exhaust injector is an electronic computing system, the electronic computing system being in communication with the intake air pump, the at least one intake injector, the exhaust air pump, and the at least one exhaust injector.

16. The improvement of claim 15, wherein the electronic computing system operates the intake injector and the exhaust injector to inject air only when the intake valve and the exhaust valve are open.

17. The improvement of claim 15, wherein the electronic computing system operates the intake injector and the exhaust injector to inject air continuously.

18. In an internal combustion engine of the type including a combustion cylinder having a combustion chamber, an intake port in fluid communication with the combustion chamber, an intake valve for opening and closing the intake port; an exhaust port in fluid communication with the combustion chamber; and an exhaust valve for opening and closing the exhaust port, the improvement comprising:
(a) at least one intake injector disposed within the intake port for injecting air into the combustion chamber;
(b) at least one exhaust injector disposed within the exhaust port for injecting air toward the exhaust valve; and
(c) means for controlling the at least one intake injector and the at least one exhaust injector;
(d) an exhaust manifold;
(e) a turbocharger including an air pump, the turbocharger being in fluid communication with the exhaust manifold;
(f) a catalytic converter being in fluid communication with the turbocharger;
(g) an exhaust pipe interconnecting the exhaust manifold, the turbocharger, and the catalytic converter; and
(h) a connecting pipe having a first end and a second end, the first end of the connecting pipe extending from the air pump of the turbocharger, the second end of the connecting pipe connecting to the exhaust pipe downstream of the turbocharger, the connecting pipe intersecting the exhaust pipe at about a 30-degree angle.

19. The improvement of claim 18, wherein the connecting pipe intersects the exhaust pipe at about 12 inches downstream of the turbocharger.

20. The improvement of claim 18, wherein the at least one exhaust injector is disposed within the exhaust manifold and directed toward the exhaust pipe.

21. In an internal combustion engine of the type including: a combustion cylinder having a combustion chamber; an intake port in fluid communication with the combustion chamber; an intake valve for opening and closing the intake port; an exhaust port in fluid communication with the combustion chamber, and an exhaust valve for opening and closing the exhaust port, the improvement comprising:
(d) at least one intake injector disposed within the intake port for injecting air into the combustion chamber;
(e) at least one exhaust injector disposed within the exhaust port for injecting air toward the exhaust valve; and
(f) means for controlling the at least one intake injector and the at least one exhaust injector;
(g) an intake air pump for providing the air to the at least one intake injector;
(h) an exhaust air pump for providing the air to the at least one exhaust injector, and wherein the means for controlling the at least one intake injector and the at least one exhaust injector is an electronic computing system, the electronic computing system being in communication with the intake air pump, the at least one intake injector, the exhaust air pump and the at least one exhaust injector.

* * * * *